March 4, 1924. 1,485,888
G. SCHONBERG
TOWLINE
Filed Aug. 23, 1922
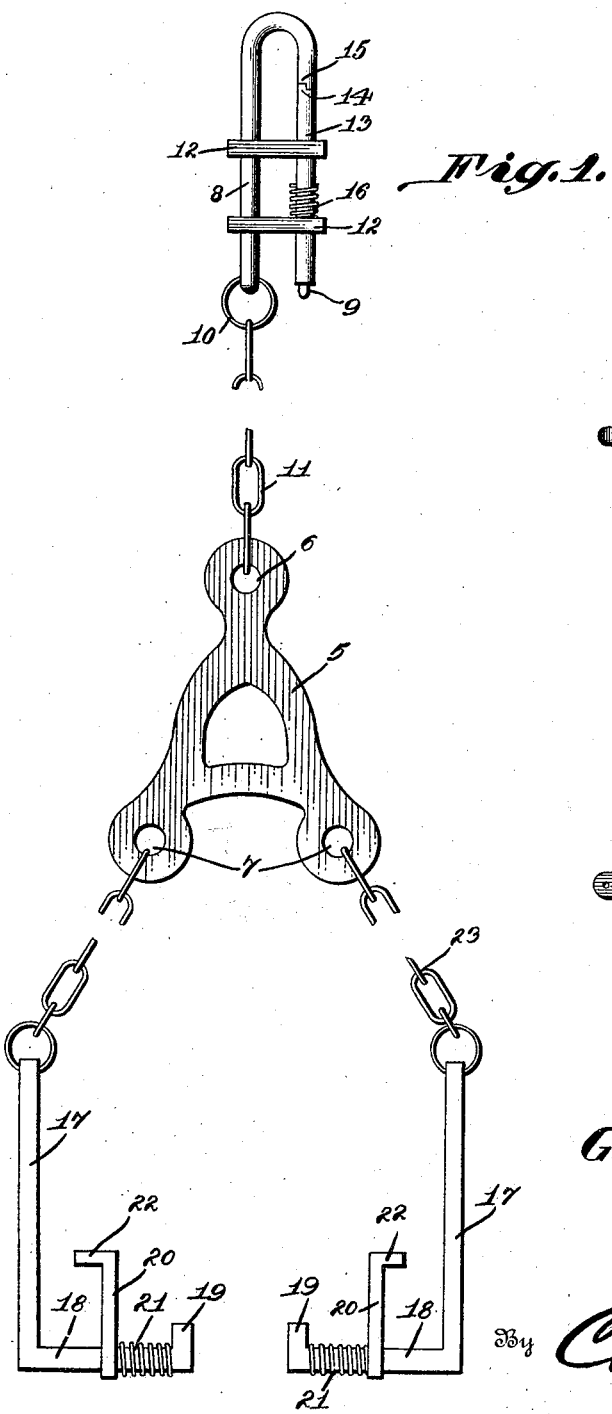
G. Schonberg,
Inventor
By C.A. Snow & Co.
Attorney Patented Mar. 4, 1924.

1,485,888

UNITED STATES PATENT OFFICE.

GEORGE SCHONBERG, OF ROLLA, NORTH DAKOTA.

TOWLINE.

Application filed August 23, 1922. Serial No. 583,919.

*To all whom it may concern:*

Be it known that I, GEORGE SCHONBERG, a citizen of the United States, residing at Rolla, in the county of Rolette and State of North Dakota, have invented a new and useful Towline, of which the following is a specification.

This invention relates to towlines, and aims to provide novel means for equally distributing the strain directed to a towing vehicle, throughout the rear construction thereof, and eliminate side draft of the vehicle being towed.

Another object of the invention is to provide means for readily and easily connecting the towline to the vehicles in a manner to prevent displacement thereof.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawing:—

Figure 1 is a diagrammatical view disclosing the towline.

Figure 2 is a front elevational view of one of the securing members.

Figure 3 is an elevational view of one of the securing members as used at the opposite end of the towline.

Referring to the drawing in detail, the device embodies a connecting plate 5, which is formed with an opening 6, and openings 7 adjacent to the opposite end of the plate, it being preferably desired however to construct the plate substantially triangularly.

The securing member which is employed for securing the towline to the towing vehicle, is indicated generally by the reference character 8 and comprises a body portion formed with an opening 9 to receive the link 10 of the chain 11 to connect the member 8 to the plate 5.

Arms 12 are secured to the body portion 8 and are formed with apertures to accommodate the sliding bolt 13, which is shown as having an offset portion 14 adapted to interlock with the offset portion 15 to prevent displacement of the securing member after the same has become properly positioned. A coiled spring 16 embraces a portion of the sliding bolt 13 and normally urges the bolt to its active or locking position.

The securing members which secure the towline to the vehicle being towed, include body portions 17 each of which is formed with a right angled portion 18 and an inwardly extended end portion 19. A movable clamping arm 20 is mounted on each of the right angled portions 18 as clearly shown by Figure 1 of the drawing, and may be moved against the tension of the coiled spring 21 associated therewith, the coiled spring acting to urge the clamping arm 20 to its clamping position.

An inwardly extended end portion 22 is adapted to contact with one surface of the front axle of the vehicle being towed to prevent the same from becoming displaced, it being understood that the clamping members are designed to embrace portions of the front axle of the vehicle.

Chains 23 connect the clamping members to the plate 5 as clearly shown by Figure 1 of the drawing. From the foregoing it will be seen that the strain directed to the vehicle being towed, due to the construction of the plate 5, is equally distributed throughout the length of the axle to which the clamping members 17 are secured, thereby preventing lateral movement or side draft.

Having thus described the invention, what is claimed as new is:—

1. In a tow line, a connecting plate, a tow chain having connection with the connecting plate, securing members, chains for connecting the securing members to the connecting plate, each of the securing members including a body portion having a right angled portion and an inwardly extended end portion, a clamping arm mounted to slide on the right angled portion, said clamping arm adapted to cooperate with the body portion to clamp an article therebetween, and resilient means for normally urging the clamping arm towards the body portion.

2. In a tow line, a connecting plate, a tow chain having connection with the connecting plate, securing members, flexible means for connecting the securing members and connecting plate, each of said securing members including a body portion having a right angled section, said right angled portion having an inwardly extended end portion, a coiled spring positioned on the right angled end portion, an arm mounted to move on the right angled portion, said arm having an inwardly extended portion, and said coiled spring being positioned between the inwardly extended end portion and arm to force the arm towards the body portion to grip an article therebetween.

In testimony that I claim the foregoing as my own, I have hereto affixed my signature in the presence of two witnesses.

GEORGE SCHONBERG.

Witnesses:
  PURDY TAYLOR,
  L. D. GOOLER.